Feb. 24, 1953
D. B. LOESER
2,629,423
MACHINE FOR FABRICATING LAMINATED SIGNATURES
PROVIDED WITH SHEET METAL INSERTS
Filed Dec. 9, 1949
10 Sheets-Sheet 4
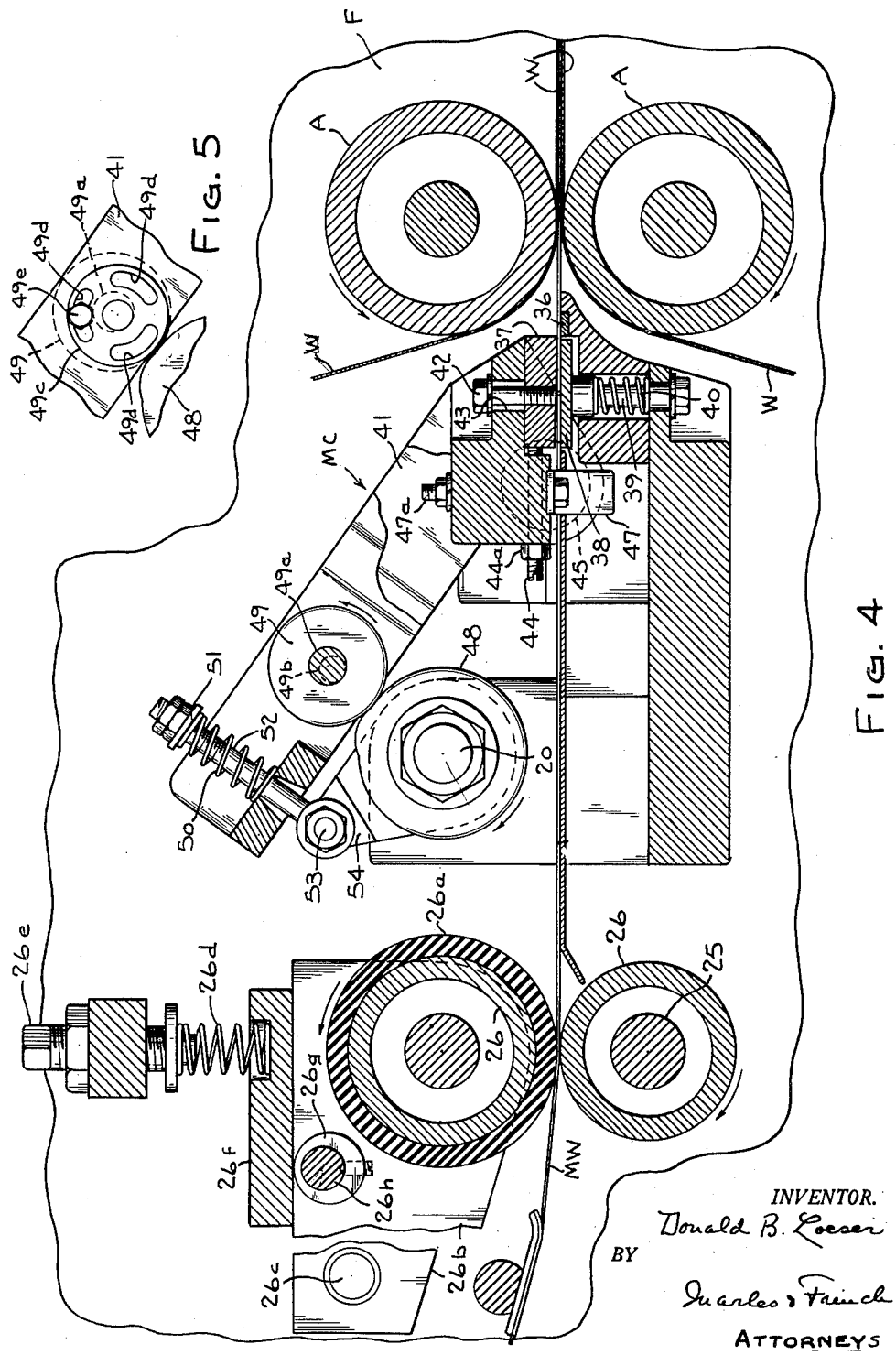
INVENTOR.
Donald B. Loeser
BY
Quarles & French
ATTORNEYS Feb. 24, 1953 D. B. LOESER 2,629,423
MACHINE FOR FABRICATING LAMINATED SIGNATURES
PROVIDED WITH SHEET METAL INSERTS
Filed Dec. 9, 1949 10 Sheets-Sheet 5

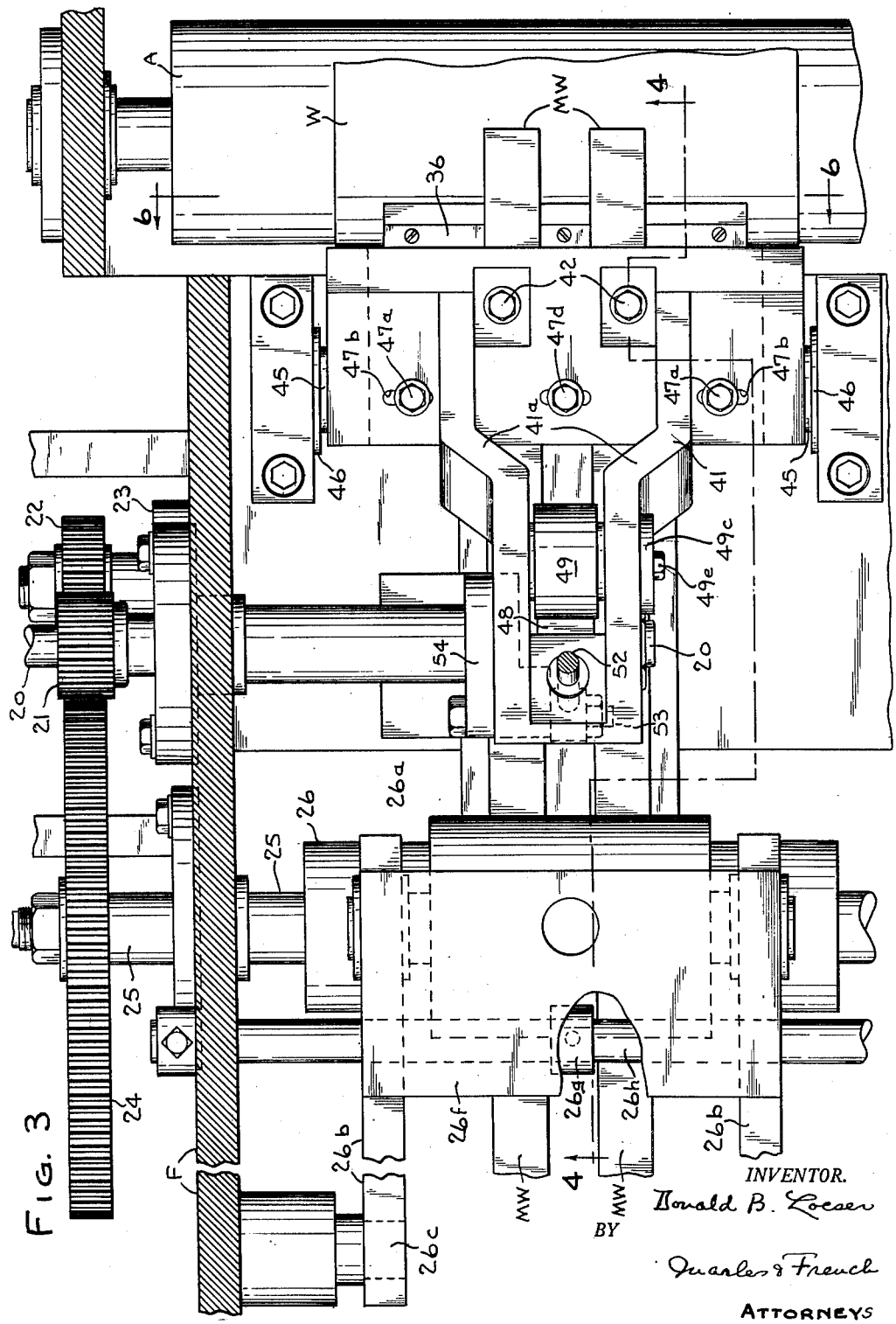

INVENTOR.
Donald B. Loeser
BY
Charles French
ATTORNEYS

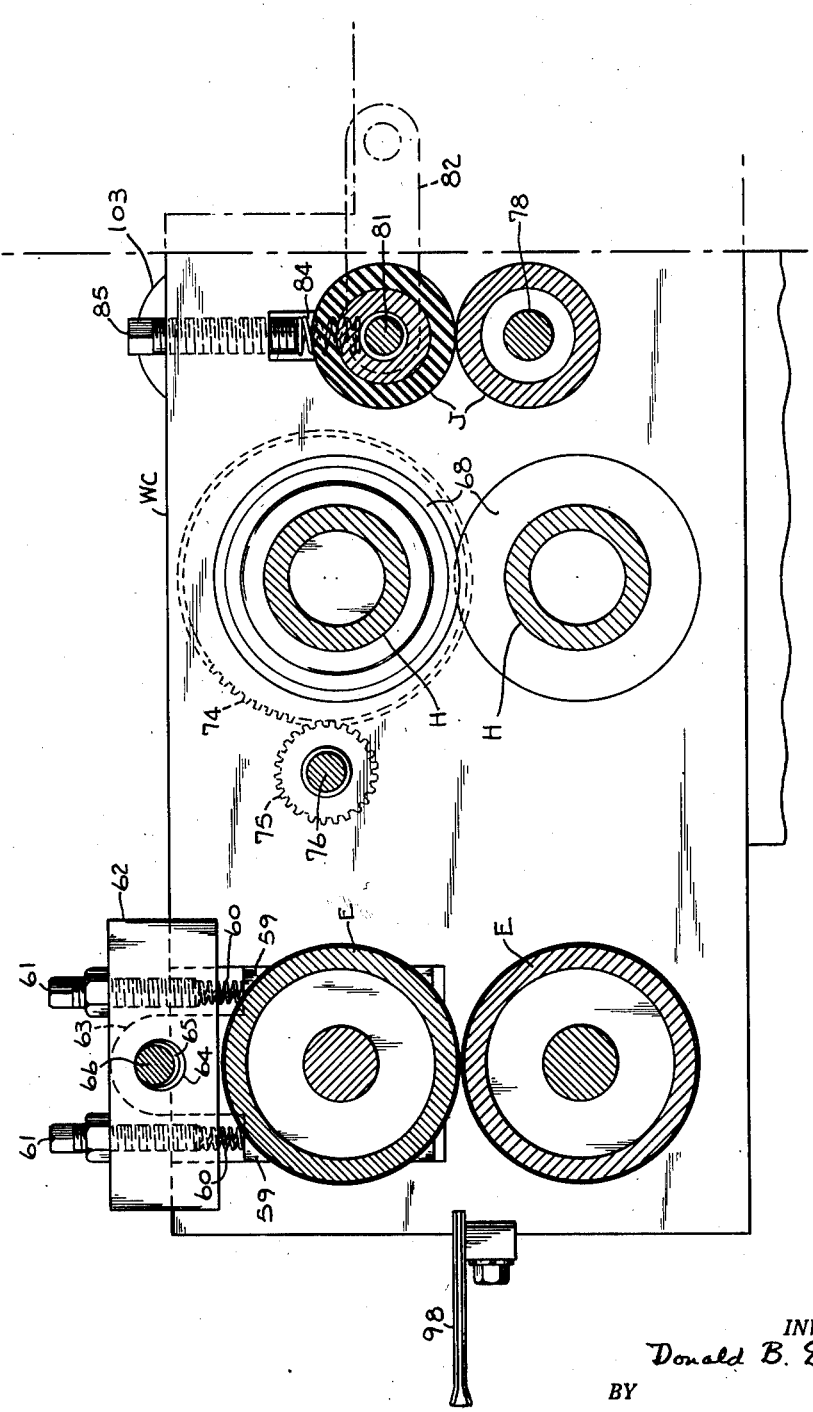

Feb. 24, 1953 D. B. LOESER 2,629,423
MACHINE FOR FABRICATING LAMINATED SIGNATURES
PROVIDED WITH SHEET METAL INSERTS
Filed Dec. 9, 1949 10 Sheets-Sheet 7

INVENTOR.
Donald B. Loeser
BY
Quarles & French
ATTORNEYS

Feb. 24, 1953 D. B. LOESER 2,629,423
MACHINE FOR FABRICATING LAMINATED SIGNATURES
PROVIDED WITH SHEET METAL INSERTS
Filed Dec. 9, 1949 10 Sheets-Sheet 9

INVENTOR
Donald B. Loeser
BY
Suarles & French
ATTORNEYS

Feb. 24, 1953 D. B. LOESER 2,629,423
MACHINE FOR FABRICATING LAMINATED SIGNATURES
PROVIDED WITH SHEET METAL INSERTS
Filed Dec. 9, 1949 10 Sheets-Sheet 10
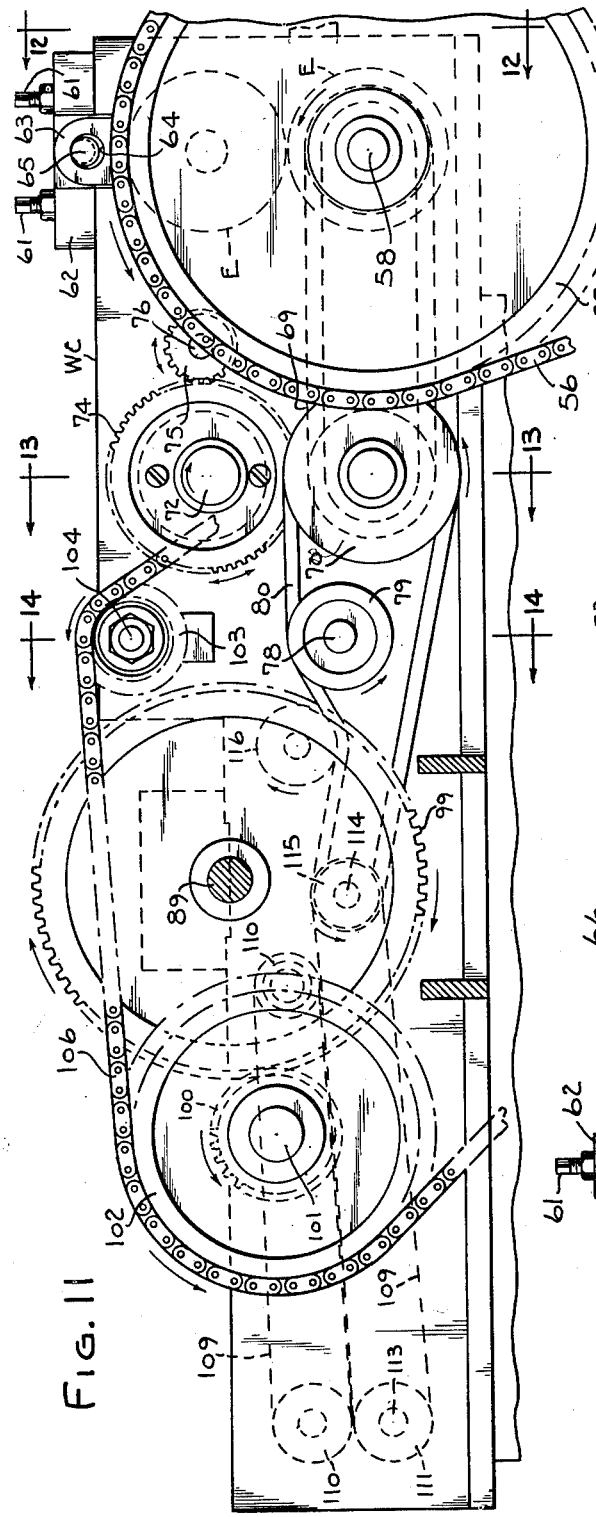
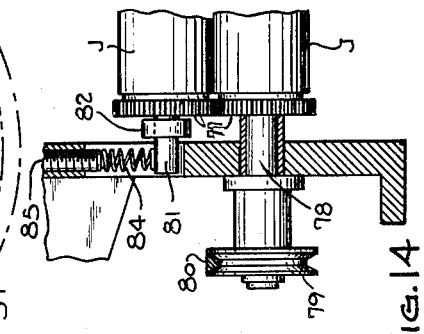
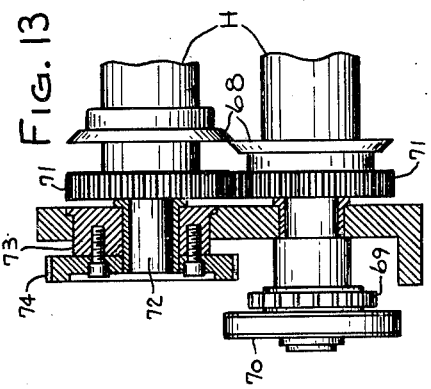
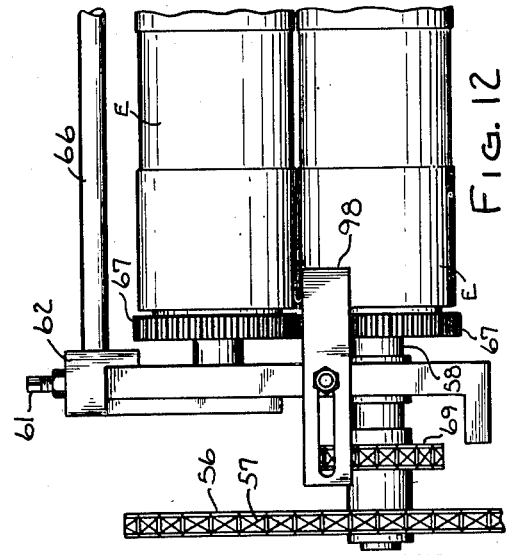
INVENTOR.
Donald B. Loeser
BY
Quarles & French
ATTORNEYS Patented Feb. 24, 1953

2,629,423

UNITED STATES PATENT OFFICE 2,629,423

MACHINE FOR FABRICATING LAMINATED SIGNATURES PROVIDED WITH SHEET METAL INSERTS

Donald B. Loeser, Milwaukee, Wis., assignor, by mesne assignments, to The Sorg Paper Company, Middletown, Ohio, a corporation of Ohio Application December 9, 1949, Serial No. 131,972

9 Claims. (Cl. 154—1.6)

The invention relates to a machine for producing laminated signatures or cards having sheet metal inserts disposed between its laminations for use, for example, in certain types of card index systems in which the properties of the metal inserts are utilized to permit ready separation or handling of said cards or signatures.

A further object of the invention is to provide a machine for inserting sheet metal inserts between adhesively joined webs of paper at spaced intervals.

A further object of the invention is to provide a machine for inserting sheet metal inserts between adhesively joined webs of paper and spaced both widthwise and lengthwise of said webs, cutting the laminated web so formed both widthwise and lengthwise to form laminated sheets having metal inserts at opposite sides of said sheets.

The invention further consists in the several features hereinafter set forth and more particularly defined by claims at the conclusion hereof.

In the drawings:

Fig. 3 is a horizontal sectional view taken on the line 3—3 of Fig. 1;

Fig. 4 is a vertical sectional view taken on the line 4—4 of Fig. 3;

Fig. 5 is a detailed end view of parts shown in Fig. 4;

Fig. 7 is a vertical sectional view through the front portion of the cutting section of the machine;

Fig. 11 is a side elevation view of the cutting section of the machine;

Fig. 12 is a detailed vertical sectional view taken on the line 12—12 of Fig. 11;

Fig. 13 is a detailed vertical sectional view taken on the line 13—13 of Fig. 11;

Fig. 14 is a detailed vertical sectional view taken on the line 14—14 of Fig. 11;

Fig. 15 is an elevation view of the drive connections between the cutting and laminating sections of the machine;

Figure 1:
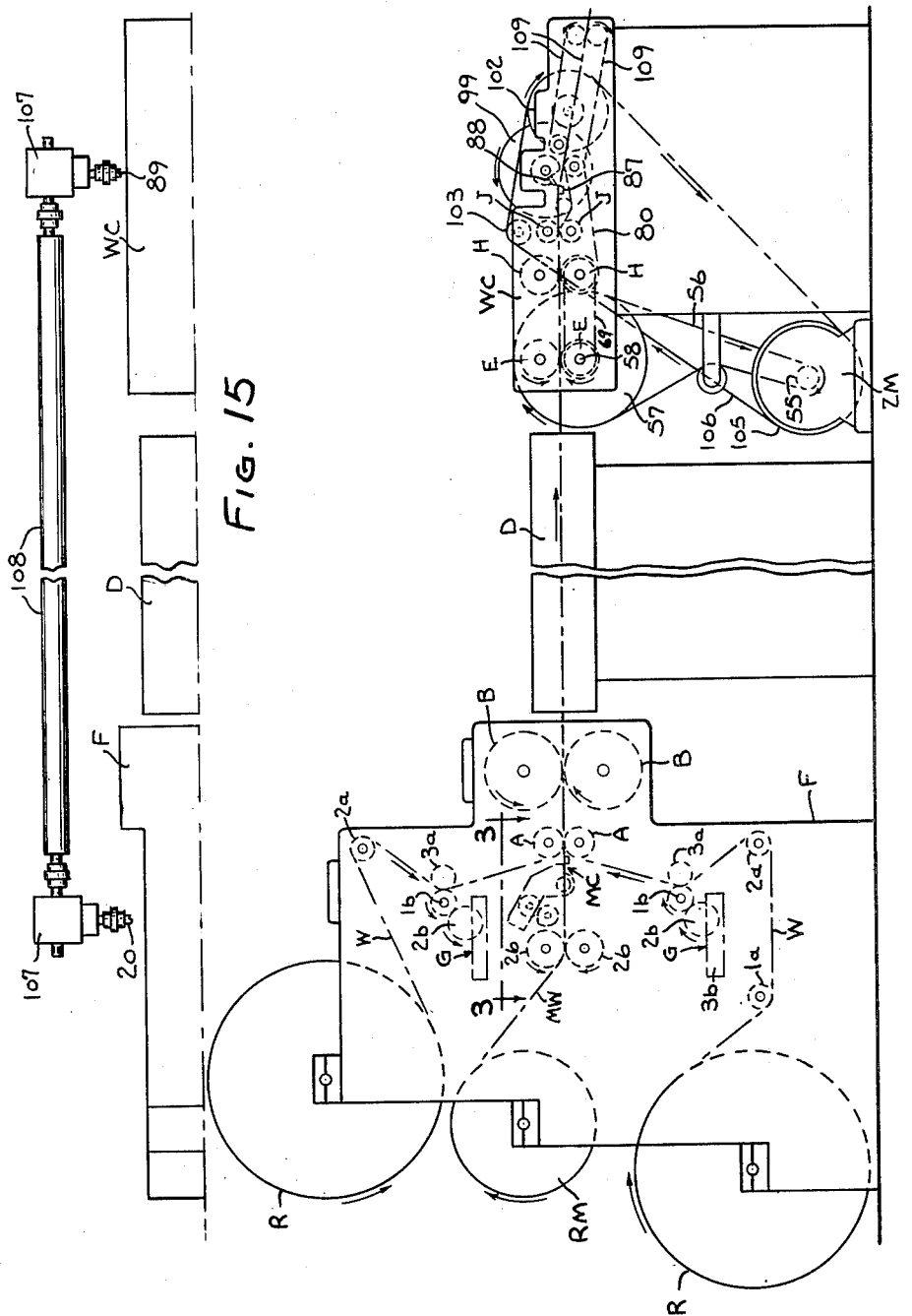
Fig. 1 is an elevational diagrammatic view of a machine embodying the invention.
Figure 2:
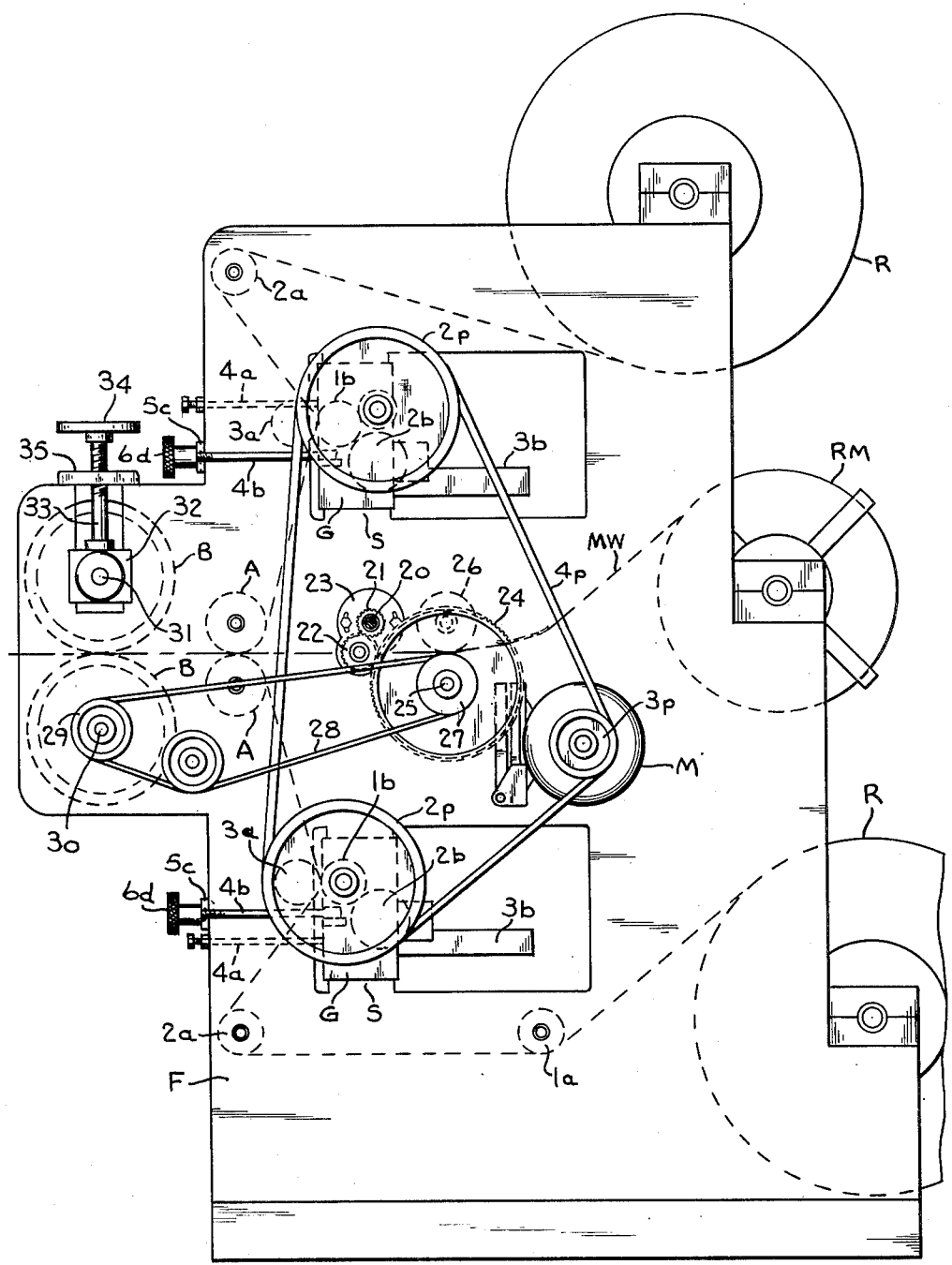
Fig. 2 is a side elevation view of the laminating section of the machine.
Figure 6:
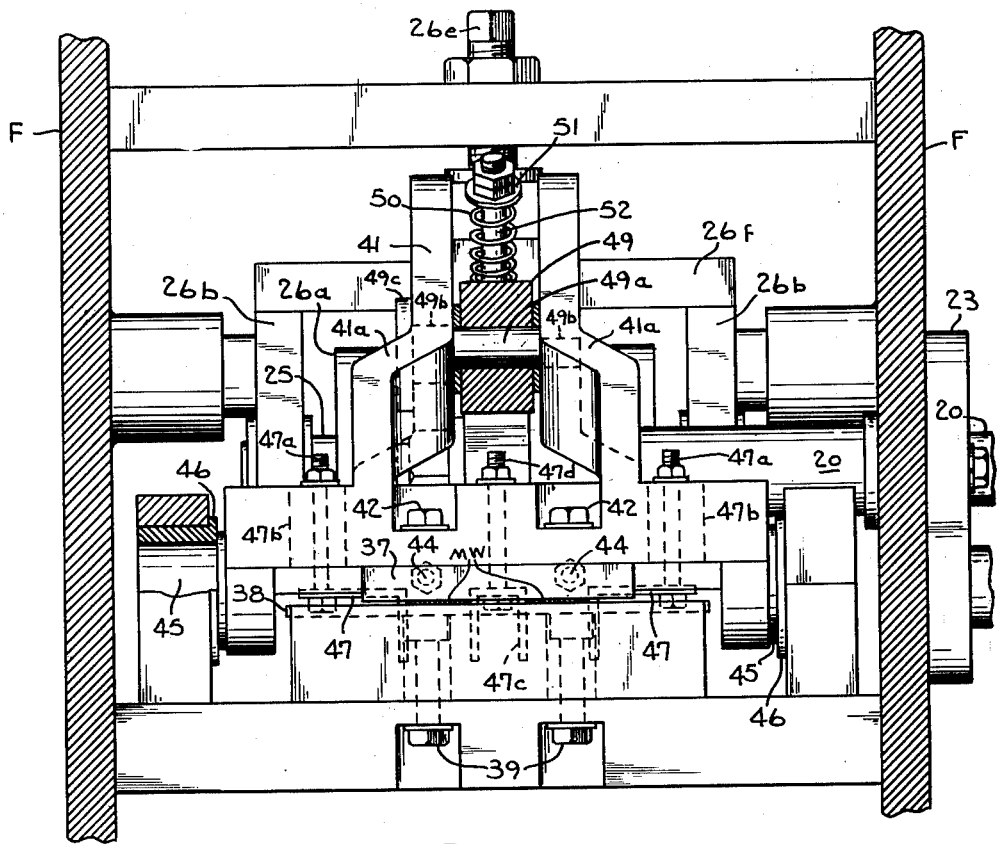
Fig. 6 is a detailed vertical sectional view taken generally along the line 6—6 of Fig. 3, parts being shown in section.
Figure 17:
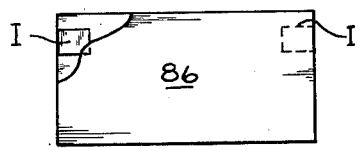
Fig. 17 is a plan view of a finished card or sheet produced by the machine, parts being broken away.

Referring to Fig. 1, according to the present invention, webs of paper W from oppositely disposed rolls R are coated on one side with adhesive applied by gluers G and joined together by passage of the webs between sets of rolls A and B. At spaced intervals lengthwise and widthwise of these webs, strips of sheet metal, fed to a cutter MC from supply rolls Rm and cut off by said cutter to a predetermined length, are fed in between the webs W as they pass between the rolls A to form a laminated web with spaced metal inserts which web is carried through a drier D and then through cutting mechanism WC where the web is slit lengthwise into two webs which are thereafter cut transversely at spaced intervals to form laminated cards or signatures having spaced metal inserts I disposed therein at opposite sides of each card as shown in Fig. 17. Referring to Figs. 1 and 2, each web W as it is drawn off from its roll R is fed over guide rolls $1a$, $2a$, and $3a$ to the rolls A. As it passes over the roll $3a$, it is coated with adhesive applied from a coating roll $1b$ supplied with adhesive from a feed roll $2b$ which dips into a supply tank $3b$ of the gluer G. Each gluer is lengthwise adjustably mounted on a support S forming part of the frame F and is secured in abutting engagement with an adjustable stop rod $4a$ by a shaft $4b$ provided with an end part $5c$ engaged by a clamping nut $6d$. Each coating roll $1b$ carries a pulley $2p$. Pulleys $2p$ are operatively connected with the pulley $3p$ of a drive electric motor M by a belt $4p$. While a gluer for each web is preferred, the invention is not to be so limited, as in some instances only one of the paper webs need be coated.

A torque tube driven shaft 20 carries a gear 21 meshing with a gear 22 mounted in a housing 23, capable of angular adjustment, to accommodate different sizes of change gears 24, said gear 24 meshing with the gear 22. The gear 24 is on a metal web feed roll shaft 25 for driving one of the feed rolls 26 which feed the webs MW from supply rolls Rm past the cutter MC into the bight between the rolls A into which the webs W are also fed, the feed of the metal webs being continuous but at a slower rate than that of the paper webs. Referring to Fig. 4, the lower driven roll 26 is a metal faced roll while the upper roll 26 has a rubber facing 26a and is carried on arms 26b mounted on a pivot shaft 26c and is yieldingly urged into feeding relation with its cooperative driven roll by an adjustably tensioned spring 26d (one being shown on Fig. 4) interposed between a headed bolt 26e and a bridge member 26f connecting the arms 26b. For feed throw out purposes, the upper roll 26 is adapted to be raised by an eccentric cam 26g mounted on an oscillatory manually operable throw out shaft 26h and engageable with said bridge 26f.

Referring to Fig. 2, the shaft 25 carries a pulley 27 connected by a belt 28 with a pulley 29 on a shaft 30 carrying the lower main feed roll B. The upper feed roll B is mounted on a shaft 31 journalled in bearing boxes 32 which are vertically adjustably mounted in the frame F by means of screw shafts 33 rotatably carried by said boxes 32 and provided with hand wheels 34, said shafts having threaded engagement with plates 35 fixed to said frame. Both of the rolls B are rubber covered, and the bearing pressure between these rolls is adjusted by the vertical adjustment of the boxes 32. The rolls A are not driven rolls but rotate under the frictional effect of the webs W as said webs are drawn forwardly by the action of the feed rolls B.

Referring to Figs. 3 to 6, the metal web cutting mechanism MC includes a fixed knife 36, an oscillatory knife 37, and a platen 38 carried by studs 39 slidably mounted on the frame F and yieldingly urged upwardly by springs 40 interposed between the heads of said studs and the frame. The knife 37 is adjustably clamped to an oscillatory lever 41 by clamping bolts 42 extending through elongated slots 43 in said lever and is engaged by longitudinally adjustable stop screws 44 mounted in said lever and locked in adjusted position by nuts 44a. Lever 41 has trunnions 45 journalled in bearings 46 mounted on the frame. Angled metal strip guides 47 are adjustably secured to the lever 41 by bolts 47a mounted in slots 47b in said lever, to permit different spacings of the inserts, and a channel metal strip guide 47c is secured to said lever by a bolt 47d and centrally disposed relative thereto so that spaced guide channels for the webs MW are provided to direct these webs through the opened cutter and to the rolls A between the webs W. The lever 41 is intermittently oscillated by a cam 48 on the shaft 29 engaging a roller 49 on the upper end of said lever. For varying the opening distance between the fixed knife 36 and the knife 37 the roller 49 is journalled on a shaft 49a having eccentrically disposed bearing portions 49b mounted in the spaced arms 41a of said lever, one of said portions 49b carrying a plate 49c provided with an arcuate slot 49d so that the shaft 49a may be angularly shifted relative to the lever 41 and locked in the desired adjusted position by a clamping bolt 49e extending through said slot into threaded engagement with said lever. The roller 49 is held in operative engagement with said cam 48 by a spring 50 interposed between an apertured seat on said lever 41 and the nut carrying end 51 of an eyebolt 52 which is pivotally connected at 53 to a fixed anchorage 54. The cam 48 always imparts a fixed stroke to the lever 41, but due to the eccentric adjustment of the roller 49, metal webs MW of varying thickness may be cut by the cutter and thus both webs MW of metal as they are fed in between the webs W are cut to predetermined lengths and embedded in the webs W as they are carried past the rolls A and through the rolls B where the laminated parts are fed as a laminated web to and through the heater D of any suitable form and the adhesive between the webs is dried, and this laminated web is then fed in between to a set of feed rolls E, the lower of said rolls E being positively driven from an electric main drive motor 2M.

Referring to Figs. 1, 7, 9, 11, and 14, the drive shaft of the motor 2M carries a sprocket 55 connected by a suitably tensioned chain 56 with a sprocket 57 on the shaft 58 carrying the lower feed roll E. The upper roll E has its shaft mounted in bearing boxes 59 which are vertically slidably mounted in the frame F and yieldingly urged downwardly by springs 60 interposed between said boxes and adjustable tensioning screws 61 mounted in blocks 62 on the side frames. The boxes 59 have extensions 63 provided with alined openings 64 in which cams or eccentrics 65 mounted on a manually oscillatory shaft 66 are disposed, said cams on the turning of the shaft 66 by the hand crank 66a acting to raise the upper roll against the pressure of the springs 60 to separate the rolls E for the initial feed through operation. The rolls E are also operatively connected together by intermeshing gears 67 (see Fig. 12), and said rolls are recessed at their central portions to accommodate that portion of the web containing the metal inserts.

After passing between the rolls E, the laminated web is fed between a pair of slitting rolls H journalled in the frame and carrying spaced disk cutters 68. The lower of these rolls H has a chain and sprocket connection 69 with the lower of the rolls E and also carries a belt pulley 70. Rolls H are also operatively connected together by intermeshing gears 71. For feed in purposes the shaft 72 for the upper roll has its bearings in eccentrics 73 which are mounted for rotational adjustment in the frame and carry gears 74 meshing with gears 75 on a manually rotatable throw out shaft 76 journalled in the frame and provided with a hand crank 76a. The sets of cutting disks 68 on the rolls H are arranged as shown in Fig. 13 and cooperate to cut the laminated web through the center and at its end portions into a pair of trimmed webs. Referring to Figs. 1, 7, 10, 11, and 14, the pair of trimmed webs then pass between a set of feed rolls J which are geared together by intermeshing gears 77. The lower roll J is a metal faced roll whose shaft 78 carries a pulley 79 driven by a belt 80 from the pulley 70 on the shaft of the lower slitter roller H. The upper roll J is a rubber faced roll whose shaft 81 is mounted in bearings in arms 82 mounted on an oscillatory throw out shaft 83 provided with hand crank 83a and journalled in the frame of the machine, said roll being yieldingly urged toward the lower roll by springs 84 interposed between its shaft ends and tension adjusting screws 85 mounted in the frame.

Figure 8:
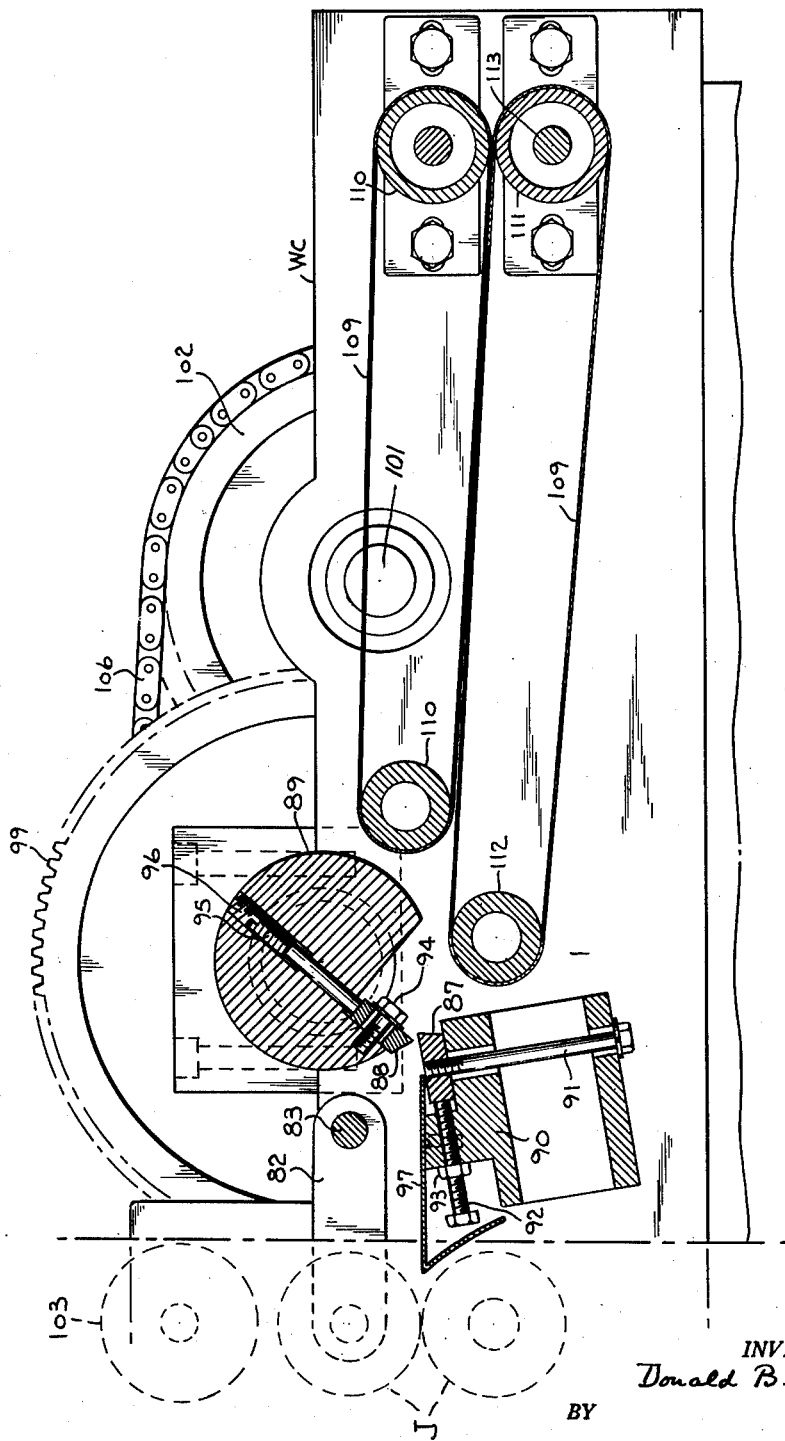
Fig. 8 is a vertical sectional view through the back portion of the cutting section of the machine.
Figure 9:
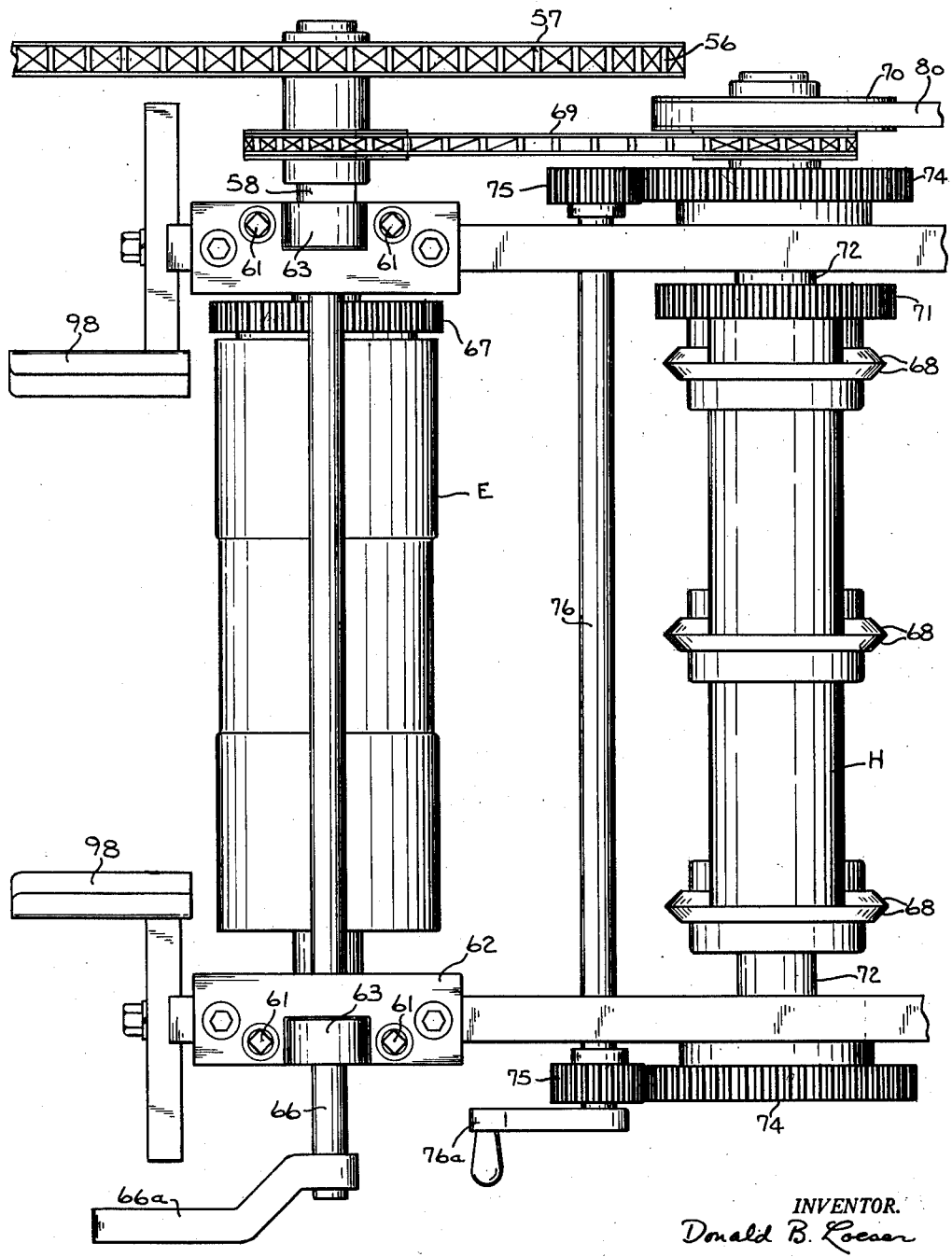
Fig. 9 is a plan view of the front portion of the cutting section of the machine.
Figure 10:
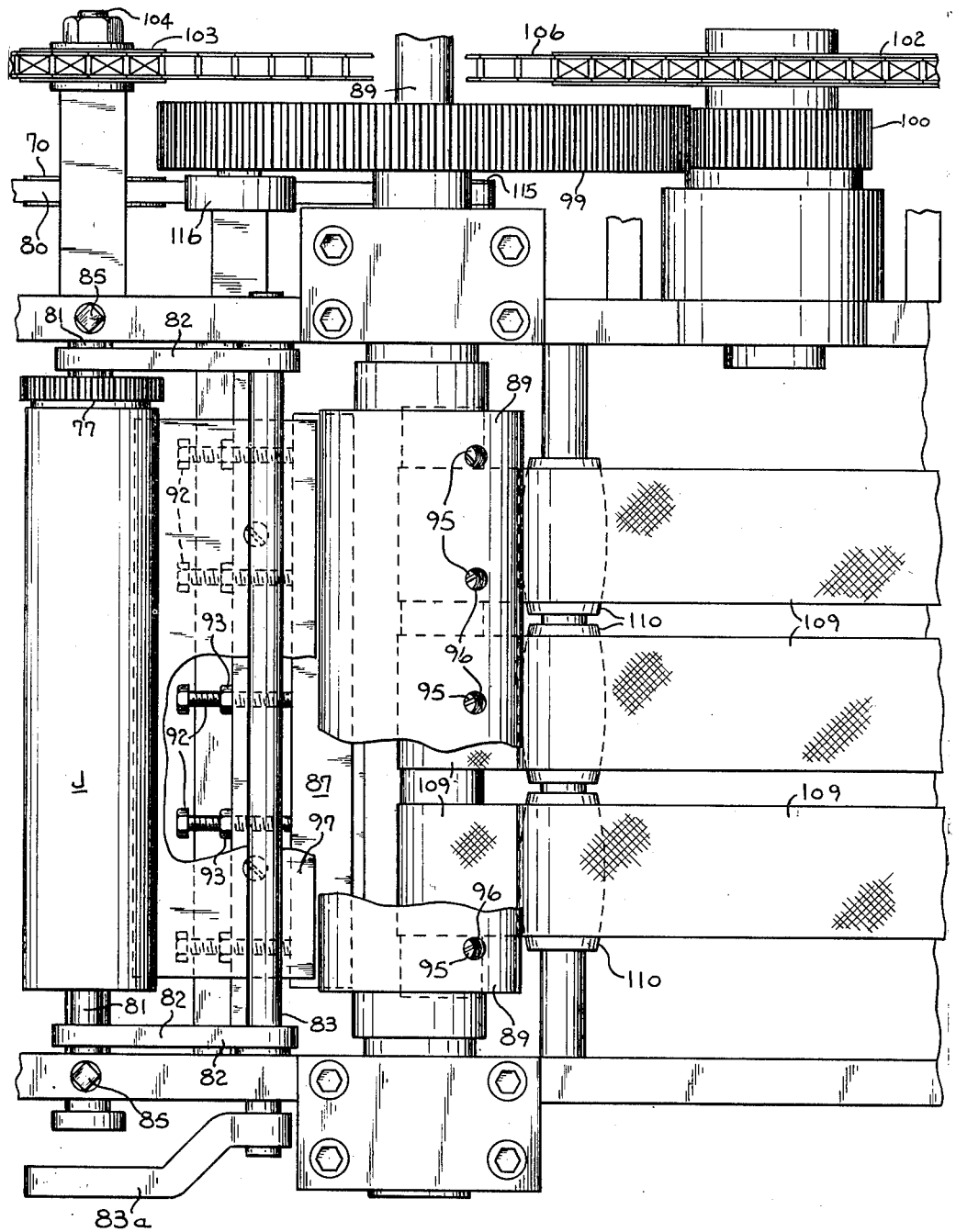
Fig. 10 is a plan view of the back portion of the cutting section of the machine.

The rolls J feed the trimmed webs past a cut off mechanism which cuts these webs into sheets or signatures of the desired width, the cutter being so adjusted as to cut across the webs directly through the centers of the metal inserts I in said webs to form the finished sheet or card 86 in which the length of the card is determined by the width of each laminated web. Referring to Figs. 8, 10, and 11, the cutting mechanism includes a fixed knife 87 and a knife 88 mounted on a rotary shaft 89. The fixed knife 87 is adjustably secured to a knife bed block 90 by a bolt 91 and may be adjusted relative to said block by set screws 92 provided with lock nuts 93. The knife 88 is adjustably clamped to the notched face of the shaft 89 by bolts 94 and may be adjusted relative to said shaft by set screws 95 extending through threaded holes 96 in said shaft. A base plate 97 is mounted on the bed block 90, and web guide brackets 98 are mounted at the forward end of the cutting section WC. The shaft 89 is journalled at its ends in the frame of the machine and carries a large gear 99 which meshes with a small gear 100 on a shaft 101 which carries a sprocket 102. Another sprocket 103 is rotatably mounted on a stud shaft 104 adjustably anchored to the frame for tensioning purposes, and as shown in Fig. 1 a large sprocket 105 is mounted on the shaft of the motor 2M. A chain 106 drivingly connects with the sprockets 102, 103, and 105 so that the cutter shaft 89 is driven from the motor 2M. In order to secure accurate timing between the operation of the rotary cutter, the operating cam 48 for the metal insert cutter and the drive for the feed rolls 26, the shafts 20 and 89 are connected together by a torque tube drive shown in Fig. 15 in which the ends of the shafts 20 and 89 each connect through gearing in the housings 107 with a torque tube 108. After the webs are cut into sheets, these sheets are carried out of the machine between the belts 109 of a delivery apron as shown in Figs. 1, 8, and 11. The upper of these aprons runs over idler pulleys 110. The lower of these aprons runs over pulleys 111 and 112 on shafts 113 and 114. The shaft 114 carries a pulley 15 which is driven by the belt 80 which is also engaged by an idler pulley 116 shown in Fig. 11.

Figure 16:
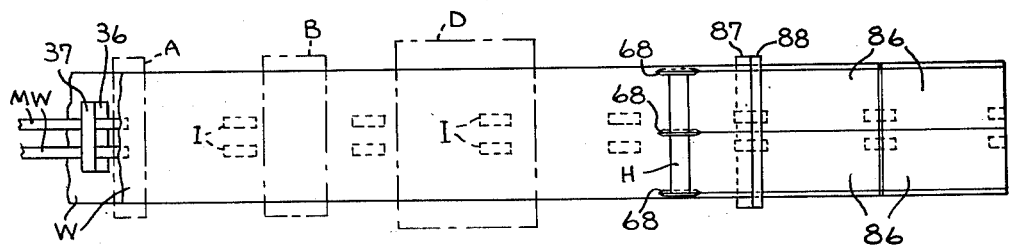
Fig. 16 is an operational view.

Referring to Fig. 16, it will be noted that the webs MW are disposed in spaced relation and that the inserts I cut from these webs are inserted between the paper webs W in the same spaced relation and the laminated web dried and then cut longitudinally into a pair of webs by the slitters 68, the central slitters dividing the original web centrally thereof and between the spaced inserts I. The final cutting of the two webs transversely divides the original web into two sheets or cards 86 in which metal inserts I are embedded in opposite sides of each card or sheet to form the finished product shown in Fig. 17.

It is to be noted that the positioning of the metal strip guides 47 and the width of the channeled metal strip guide 47c may be varied so as to vary the spacing of the metal inserts relative to the finished laminated web, or these parts may be adjusted relative to each other to accommodate different widths of web, and in accordance with known practice the supports for the metal rolls RM are such as to permit shifting these rolls relative to said supports so as to accommoadte the spacing of the guides 47 and 47c.

In addition to the use of cards made by the present machine as parts of card index systems, the laminated sheets with metal inserts therein may be used as sheets of loose leaf binders with the perforations to receive the binder being made through the metal insert portions thereof which will provide a firm anchorage for the binder and prevent tearing of the sheet.

I desire it to be understood that this invention is not to be limited to any particular form or arrangement of parts except in so far as such limitations are included in the claims.

What I claim as my invention is:

1. In a machine of the character described, the combination of a pair of continuously active feed rolls, means for continuously feeding webs of paper between said feed rolls, means for coating at least one of said webs of paper with an adhesive as it proceeds to said feed rolls for laminating said webs together on their passage between said feed rolls, means for continuously feeding a web of sheet metal to and between said webs of paper lengthwise thereof, means disposed between said metal web feeding means and said feed rolls for intermittently cutting said metal web as it is fed to said rolls into a series of sheet metal inserts to be embedded between said paper webs as said paper webs and inserts pass between said feed rolls, said sheet metal web feeding means operating at a slower speed than said feed rolls whereby said metal inserts are disposed in said laminated webs in lengthwise spaced relation.

2. The structure as defined in claim 1 together with means for transversely cutting said laminated web with the spaced inserts therein midway of the length of said inserts to form laminated sheets having spaced metal inserts at each side extending to the side edge thereof.

3. In a machine of the character described, the combination of a pair of continuously active feed rolls, means for continuously feeding webs of paper between said feed rolls, means for coating at least one of said webs of paper with an adhesive as it proceeds to said feed rolls for laminating said webs together on their passage between said feed rolls, means for continuously feeding a web of sheet metal lengthwise to and between said webs of paper, a cutter including an oscillatory knife disposed between said metal web feeding means and said feed rolls, a cam for intermittently oscillating said cutter to cut said metal web into a series of metal inserts to be embedded between said paper webs as said paper webs and inserts pass between said feed rolls, said sheet metal web feeding means operating at a slower speed than said feed rolls whereby said metal inserts are disposed in said laminated webs in lengthwise spaced relation, means for transversely cutting said laminated web through the insert portions of said web to form laminated sheets having spaced metal inserts at each side extending to the side thereof, and means for positively driving said last named cutting means, said cam and said metal web feeding means in a predetermined synchronized relation.

4. In a machine of the character described, the combination of means for coating at least one of a pair of paper webs on one side with adhesive, continuously acting feeding means for feeding said paper webs and bringing said webs together to form an adhesively united laminated paper web, means for continuously feeding a web of thin sheet metal lengthwise between said paper webs as they are brought together, and means for intermittently cutting off sections of said metal web as it is fed between said paper webs to form spaced metal inserts in said laminated paper web.

5. In a machine of the character described, the combination of means for coating at least one of a pair of paper webs on one side with adhesive, continuously acting feeding means for feeding said paper web and bringing said webs together to form an adhesively united laminated paper web, means for continuously feeding sheet metal inserts between said paper webs and lengthwise of said webs and at spaced intervals widthwise of said webs as said webs are brought together to form a laminated web, means for drying the laminated web, means for dividing said dried web into a pair of webs with lengthwise and widthwise spaced inserts in each of said webs, and means for cutting said pair of dried webs transversely of said inserts into sheets having spaced metal inserts at opposite sides of said sheets.

6. In a machine of the character described, the combination of means for coating at least one of a pair of paper webs on one side with adhesive, continuously acting feeding means for feeding said paper webs and bringing said webs together to form an adhesively united laminated paper web, means for continuously feeding sheet metal inserts between said paper webs and lengthwise of said webs and at spaced intervals as said webs are brought together to form a laminated web, means for drying the laminated web, and means for transversely cutting said moving laminated web through the metal insert portion thereof to form sheets having spaced metal inserts at opposite sides thereof.

7. In a machine of the character described, the combination of means for coating at least one of a pair of paper webs on one side with adhesive, continuously active feeding means for bringing said webs together to form an adhesively united laminated continuously moving paper web, means for continuously feeding spaced webs of thin sheet metal lengthwise between said paper webs, means for intermittently cutting off sections of said metal webs as they are fed between said paper webs to form metal inserts in said moving laminated web, as it is formed, spaced both widthwise and lengthwise thereof, means for drying said moving laminated web, and means for cutting said web progressively lengthwise and transversely into a plurality of sheets, each sheet having spaced metal inserts at opposite sides thereof.

8. In a machine of the character described, the combination of means for coating at least one of a pair of paper webs on one side with adhesive, continuously acting feeding means for bringing said webs together to form an adhesively united laminated continuously moving paper web, means for continuously feeding spaced webs of thin sheet metal lengthwise between said paper webs, means for intermittently cutting off sections of said metal webs as they are fed between said paper webs to form metal inserts in said moving laminated web, as it is formed, spaced both widthwise and lengthwise thereof, means for drying said laminated web, means for dividing said dried web into a pair of webs with lengthwise and widthwise spaced inserts in each of said webs, means for cutting said moving webs transversely through the metal insert portions thereof to form sheets having spaced metal inserts at opposite sides thereof, and means for operating both of said cutting means including a torque tube positive drive connection between said cutting means.

9. In a machine of the character described, the combination of means for coating at least one of a pair of paper webs on one side with adhesive, a pair of rolls between which said paper webs are brought together with the adhesive between said webs to form a laminated web, means for continuously feeding sheet metal inserts lengthwise between the webs at spaced intervals both widthwise and lengthwise of said laminated web and between the webs thereof as said laminated web is formed, a pair of positively continuously driven feed rolls for continuously advancing said laminated web, means for exerting pressure on the web as it passes between said positively driven feed rolls, means for drying said laminated web, a pair of positively continuously driven feed rolls between which the dried laminated web is fed, a pair of positively driven slitter rolls for cutting said dried laminated web between the metal insert portions thereof into separate webs after passing said last named rolls, and a cutter including a rotary blade for simultaneously cutting both of said separate webs transversely thereof through those portions thereof containing said inserts to form sheets having spaced metal inserts on opposite sides thereof extending to their side edges.

DONALD B. LOESER.

REFERENCES CITED

The following references are of record in the file of this patent:

UNITED STATES PATENTS

| Number | Name | Date |
| --- | --- | --- |
| 1,002,303 | Newsome | Sept. 5, 1911 |
| 1,774,780 | Wood | Sept. 2, 1930 |
| 1,824,583 | Wood | Sept. 22, 1931 |
| 1,883,562 | Chipman et al. | Oct. 18, 1932 |
| 2,284,762 | Olsen | June 2, 1942 |
| 2,290,386 | Schindler | July 21, 1942 |
| 2,385,659 | Tornberg | Sept. 25, 1945 |
| 2,467,565 | Owens et al. | Apr. 19, 1949 |
| 2,467,572 | Weisselberg | Apr. 19, 1949 |